United States Patent [19]

Tsutsui et al.

[11] Patent Number: 4,700,283
[45] Date of Patent: Oct. 13, 1987

[54] CONTROL SYSTEM FOR AN ELECTRIC LOCOMOTIVE HAVING AC TO DC CONVERTERS

[75] Inventors: Yoshio Tsutsui; Kiyoshi Nakamura; Akira Kimura, all of Katsuta; Hayato Imai, Hitachi; Kaoru Tamura, Hitachi; Shozuchi Miura, Hitachi, all of Japan

[73] Assignee: Hitachi, Ltd., Tokyo, Japan

[21] Appl. No.: 853,552

[22] Filed: Apr. 18, 1986

[30] Foreign Application Priority Data

Apr. 19, 1985 [JP] Japan .................. 60-82413

[51] Int. Cl.⁴ .......................................... H02M 7/155
[52] U.S. Cl. ....................................... 363/68; 363/84; 363/125; 323/207; 323/211
[58] Field of Search ...................... 363/68, 84, 85, 125, 363/128; 323/207, 211; 318/345 R, 345 C, 345 G, 376, 438

[56] References Cited

U.S. PATENT DOCUMENTS

| 4,020,411 | 4/1977 | Tsuboi et al. ........................ 363/68 |
| 4,144,559 | 3/1979 | Okumura et al. ................. 363/68 X |
| 4,245,291 | 1/1981 | Tsutsui et al. ........................ 363/68 |
| 4,306,283 | 12/1981 | Kiwaki et al. ........................ 363/68 |
| 4,358,819 | 11/1982 | Sandberg .............................. 363/68 |
| 4,375,076 | 2/1983 | Magnusson et al. .................. 363/68 |
| 4,420,713 | 12/1983 | Chandran et al. ................ 363/68 X |
| 4,471,421 | 9/1984 | Brown et al. ...................... 363/68 X |
| 4,555,752 | 11/1985 | Kurosawa ............................. 363/68 |
| 4,570,111 | 2/1986 | Sato ............................. 318/345 C X |

Primary Examiner—Patrick R. Salce
Assistant Examiner—Emanuel Todd Voeltz
Attorney, Agent, or Firm—Fay, Sharpe, Beall, Fagan, Minnich & McKee

[57] ABSTRACT

An electric locomotive has two AC-DC converters which are connected in cascade, and a power factor controller is connected to one of the converters. Two automatic pulse phase shifters are provided for the two converters and controlled by a signal responding to a difference signal between a current flowing in the converters and a reference signal. One of the input signals of the automatic pulse phase shifter is regulated by a bias signal. The output from each of the automatic pulse phase shifters to each of the converters is switched when the measured speed of the locomotive exceeds a predetermined reference speed signal.

29 Claims, 18 Drawing Figures

CONTROL SYSTEM FOR AN ELECTRIC LOCOMOTIVE HAVING AC TO DC CONVERTERS

FIELD OF THE INVENTION

The present invention relates to a control system for electric locomotives having AC to DC converters and, more particularly, to a power factor controller for a control system.

BACKGROUND OF THE INVENTION

In order to regulate the speed of an electric locomotive, thyristors included in AC to DC converters are controlled by firing signals. Since the AC to DC converters generate high harmonic frequency currents which form a psophometric disturbing current, it is necessary to provide a power factor controller to reduce the psophometric disturbing current as well as to improve the power factor of the electric locomotive. Many examples of earlier efforts to provide a power factor controller are described in references such as Japanese Pat. Laid-open Nos. Sho 55-100037, Sho 56-19305 and 56-42819, etc. Although some of these references disclose concepts of merit, currently available power factor controllers require more improvement.

It is desirable for a power factor controller to have three characteristics as follows:

(1) small size because the locomotive has very limited space;

(2) ability to reduce the psophometric disturbing current to under a predetermined value; and (3) ability to prevent over-compensation which might change a lagging power factor into a leading power factor.

SUMMARY OF THE INVENTION

It is an object of the present invention to provide an improved power factor controller.

It is another object to provide a control system having a small size.

It is another object to provide a control system for effectively reducing a psophometric disturbing current.

It is another object of the present invention to provide a method for controlling converters to effectively reduce psophometric disturbing current.

If an electric locomotive is provided with a power factor controller having a capacity for perfectly removing a psophometric disturbing current during transition from no load to 100% load states, the power factor controller will typically be very large in size and will over-compensate and thereby convert the power factor from a lagging to a leading power factor. In an electric locomotive with cascade connections of AC and DC converters, the speed of the locomotive is regulated by control of each of the phase control angles of the converters.

Therefore, in the present invention, regardless of whether all of the capacitance is connected to one converter, or unequally divided between the converters, the power factor controller should be connected to the converter having the greater phase control angle in order to effectively remove the psophometric disturbing current created by the phase control angle of that converter. Since each of the converters is independently supplied with firing signals having different phase control angles by different firing signal generators, connections between the converters and the firing signal generators are switched when a predetermined locomotive status is satisfied.

DETAILED DESCRIPTION

Figure 1:
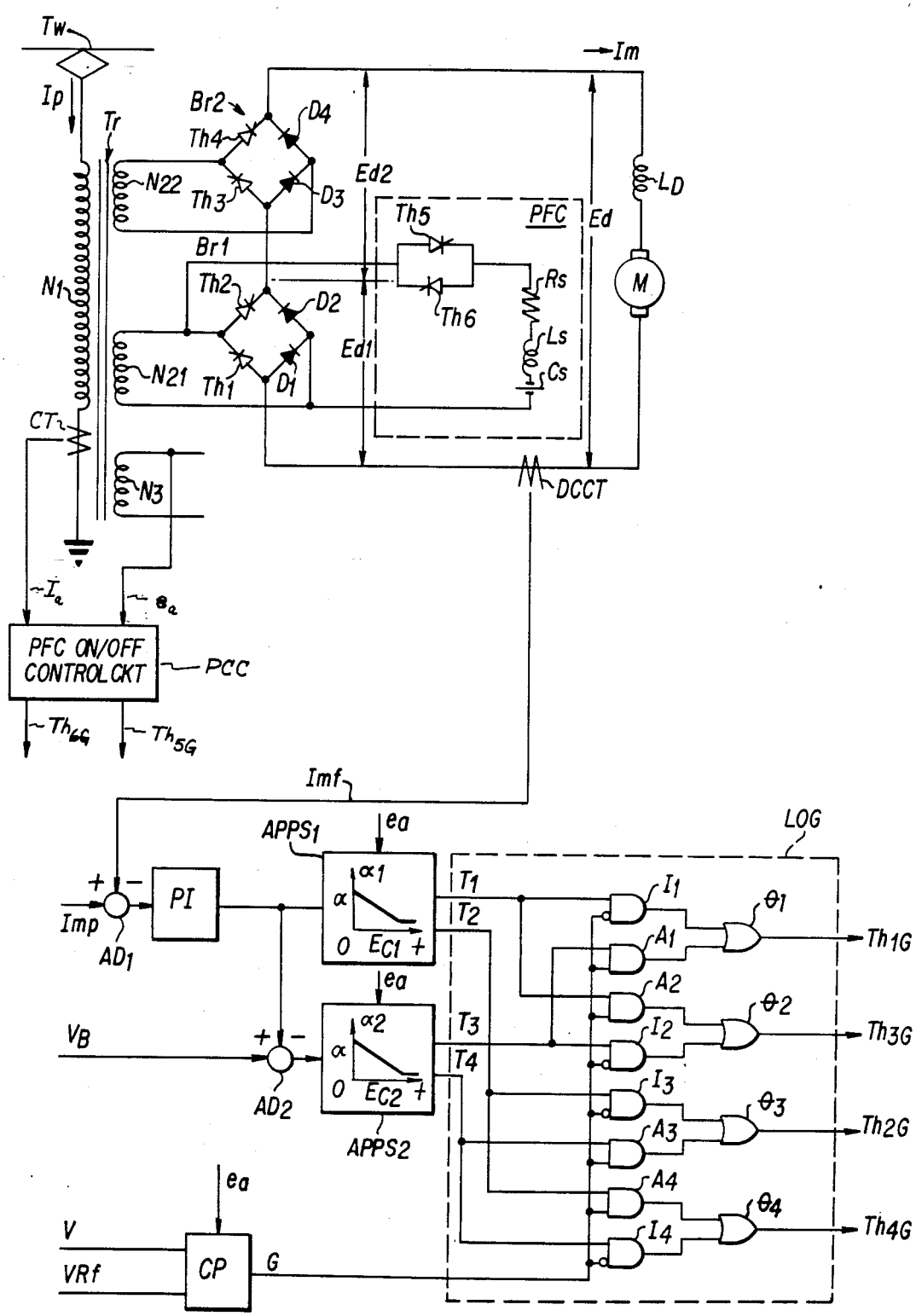
FIG. 1 shows a diagram of one embodiment of the present invention.

FIG. 1 shows a diagram of the preferred embodiment of the present invention. In the drawing, $T_r$ denotes a transformer, one terminal of a primary winding $N_1$ of which is connected to a trolley wire $T_w$, which is connected to an AC substation (not shown) provided on the ground through a pantograph, and the other terminal of which is connected to a reference potential, such as a ground, through an electrically conducting wheel (not shown). $N_{21}$ and $N_{22}$ denote secondary windings of transformer $T_r$, to which hybrid bridges $B_{r1}$ and $B_{r2}$ are respectively connected. $N_3$ denotes a third winding of the transformer $T_r$. The hybrid bridges $B_{r1}$ and $B_{r2}$, which include two diodes $D_1$ and $D_2$ and $D_3$, $D_4$, respectively, and two thyristors $Th_1$, and $Th_2$ and $Th_3$ and $Th_4$, respectively, are arranged in a cascade connection to which a smoothing inductance $L_D$ and a DC main motor M are connected in series. The bridges $B_{r1}$ and $B_{r2}$ operate as AC to DC converters. PFC denotes a power factor controller shown surrounded by dashed lines which includes a series circuit of two thyristors $T_{h5}$, $T_{h6}$ connected in parallel in a back-to-back configuration; a resistance $R_s$, a smoothing inductance $L_s$ and a capacitance $C_s$ are connected to bridge $B_{r1}$. $E_{d1}$, $E_{d2}$ and $E_d$ denote DC voltages, the former two of which are generated by the bridges $B_{r1}$ and $B_{r2}$, respectively; $E_d$ is a total of the output voltages of both bridges applied to DC main motor M.

CT denotes a current transformer which detects a pantograph current $I_p$ flowing in primary winding $N_1$ and provides a current signal $I_a$. DCCT denotes a direct current transformer which detects a motor current $I_m$ flowing in the DC main motor M and provides a current feedback signal $I_{mf}$. The third winding $N_3$ provides an AC voltage $e_a$ corresponding to the AC voltage applied to primary winding $N_1$. PCC denotes a PFC on-off control circuit which generates firing signals $Th_{5G}$ and $Th_{6G}$ when the power factor of the input power of the locomotive exceeds a predetermined value according to signals $I_a$ and $e_a$. PI denotes a proportional and integral operational amplifier to which is applied a differential signal, which is an output of an adder $AD_1$, together with the signal $I_{mf}$ and a predetermined reference current signal $I_{mp}$. $APPS_1$ and $APPS_2$ denote automatic pulse phase shifters which generate firing signals having phase control angles based on the AC voltage $e_a$ and corresponding to input signals $E_{c1}$, $E_{c2}$. The output signal of the PI is applied as an input signal to $APPS_1$, and a differential signal, which is an output of an adder $AD_2$, is applied to $APPS_2$, together with the output signal of the proportional and integral operational amplifier PI and a predetermined bias signal $V_B$, as an input signal. In turn, the $APPS_1$, and $APPS_2$ generate phase control signals $T_1$ and $T_2$, and $T_3$ and $T_4$ having different phase control angles $\alpha_1$ and $\alpha_2$, respectively, corresponding to the output of the PI amplifier. CP denotes a comparator which provides a gate change signal G synchronized with the AC voltage $e_a$ when a measured speed signal v of the locomotive exceeds a predetermined reference speed signal $V_{Rf}$.

Log denotes a logical change circuit which includes four AND gates $A_1$, $A_2$, $A_3$ and $A_4$, four Inhibit gates $I_1$, $I_2$, $I_3$ and $I_4$ and four OR gates $\theta_1$, $\theta_2$, $\theta_3$ and $\theta_4$. In the logical change circuit, the gates are combined to give firing signals from corresponding phase control signals as follows:

| gate change signal | APPS$_1$ | | APPS$_2$ | |
|---|---|---|---|---|
| G | $T_1(+\alpha_1)$ | $T_2(-\alpha_1)$ | $T_3(+\alpha_2)$ | $T_4(-\alpha_2)$ |
| "0" | $Th_{1G}$ | $Th_{2G}$ | $Th_{3G}$ | $Th_{4G}$ |
| "1" | $Th_{3G}$ | $Th_{4G}$ | $Th_{1G}$ | $Th_{2G}$ |

Where $Th_{1G}$, $Th_{2G}$, $Th_{3G}$ and $Th_{4G}$ denotes firing signals to the gate terminals of the thyristors $Th_1$, $Th_2$, $Th_3$ and $Th_4$, respectively.

$T_1$, $T_2$, $T_3$ and $T_4$ denote phase control signals from $APPS_1$ and $APPS_2$; and + and − symbols indicate whether the phase control signals are positive or negative half waves of the AC voltage $e_a$, while $\alpha_1$ and $\alpha_2$ indicate the values of phase control angles, respectively.

In the embodiment of FIG. 1, phase control signals $T_1$ and $T_2$ from $APPS_1$ are applied to the logic circuit to trigger firing signals $Th_{1G}$ and $Th_{2G}$, which are in turn applied to the gate terminals of thyristors $Th_1$ and $Th_2$ of bridge $B_{r1}$, and phase control signals $T_3$ and $T_4$ from $APPS_2$ are applied to the logic circuit to trigger firing signals $Th_{3G}$ and $Th_{4G}$, which are in turn applied to the gate terminals of the thyristor $Th_3$ and $Th_4$ of the bridge $B_{r2}$ when the measured speed signal v is lower than the reference signal $V_{Rf}$, as configured, the output of the comparator CP is "0". However, the output of the comparator CP becomes "1" when the measured speed signal v exceeds reference signal $V_{Rf}$, phase control signals $T_1$ and $T_2$ of $APPS_1$ are applied to the logic circuit to trigger firing signals $Th_{1G}$, $Th_{2G}$ which are in turn applied to bridge $B_{r1}$, phase control signals $T_3$ and $T_4$ of $APPS_2$ are applied to the logic circuit to trigger firing signals $Th_{3G}$, $Th_{4G}$ which are applied to bridge $B_{r2}$. This means that the power factor controller PFC is connected to the bridge to which phase control signals having the larger phase control angle are applied, and which generates the larger portion of the psophometric disturbing current $J_p$. In other words, the power factor controller PFC most effectively reduces the high harmonic frequency currents, and thereby suppresses the psophometric disturbing current $J_p$ by switching the phase control angle.

Figure 2:
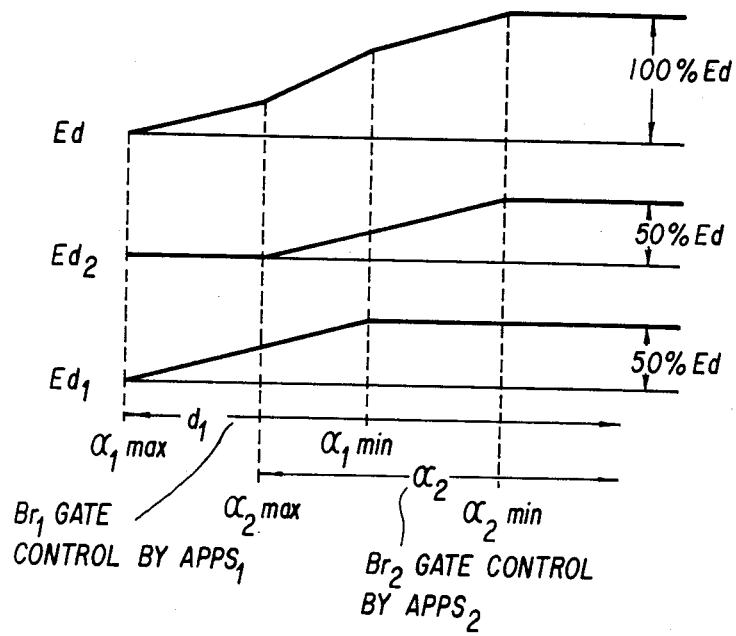
FIG. 2 shows characteristic curves of output voltages for currently available AC to DC converters.
Figure 3:
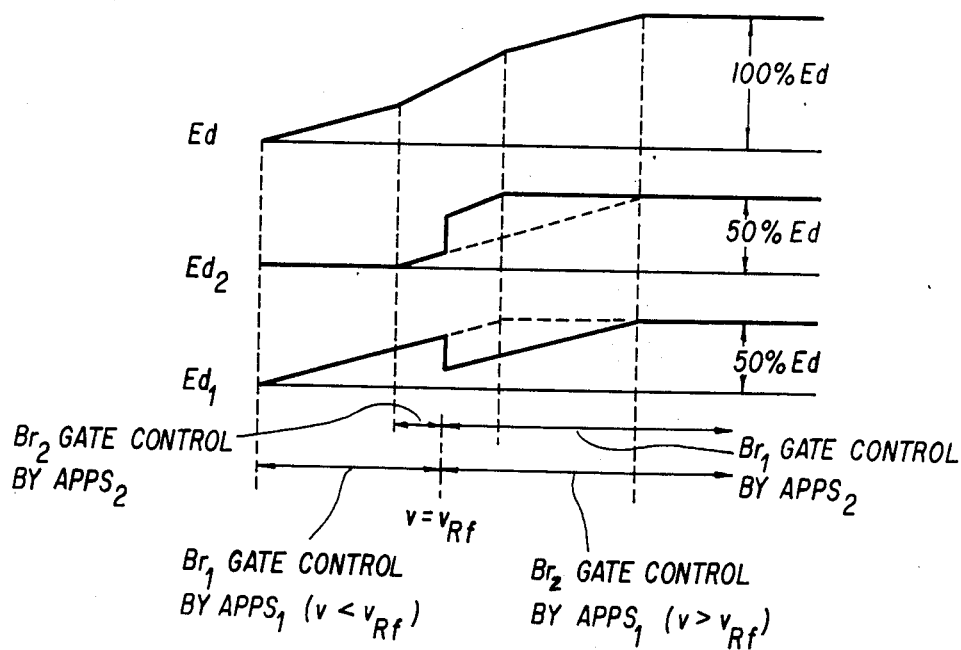
FIG. 3 shows an example of characteristic curves of output voltages for the preferred embodiment shown in FIG. 1.

FIGS. 2 and 3 show examples of characteristic curves of AC to DC converter output voltages obtained from a conventional control system and the embodiment shown in FIG. 1, respectively. As shown in FIG. 2, in the conventional system, each bridge $B_{r1}$ and $B_{r2}$ is separately and exclusively controlled by different automatic pulse phase shifters $APPS_1$ and $APPS_2$, from maximum control angle to minimum control angle. The starting point in the control of bridge $B_{r2}$ occurs after bridge $B_{r1}$ has established a predetermined value of DC voltage $E_{d1}$, and is determined by the value of the bias voltage $V_B$ being applied to adder $AD_2$.

Contrarily, as shown in FIG. 3, in the embodiment of FIG. 1, bridge $B_{r1}$ is controlled by the $APPS_1$ and bridge $B_{r2}$ is controlled by the $APPS_2$ while the speed of the locomotive is lower than the predetermined reference signal $V_{Rf}$. However, the firing signals triggered by phase control signals $T_1$, $T_2$ and $T_3$, $T_4$ from $APPS_1$ and $APPS_2$ are switched from bridges $B_{r1}$ and $B_{r2}$ to the bridges $B_{r2}$ and $B_{r1}$, respectively, when the value of speed signal v exceeds reference signal $V_{Rf}$. In the latter instance, the output DC voltage $E_{d1}$ of the bridge $B_{r1}$ drops because bridge $B_{r1}$ is controlled by a larger phase control angle than before the switch precipitated by the value of locomotive speed signal v exceeding $V_{Rf}$. This means that bridge $B_{r1}$, to which the power factor controller PFC is connected, operates as an AC to DC converter to control the DC voltage $E_d$ and that the amplitude of the psophometric distrubing current $J_p$, which is generated by the bridge having a large phase control angle, is effectively reduced when that bridge is connected to the PFC.

As is well known, the psophometric disturbing current $J_p$ is defined as follows:

$$J_p = \sum_{n=1}^{n} (S_n \times |I_n|)^2$$

where
  n: an ordinal number of a harmonic frequency;
  $I_n$: n-th harmonic current included in the pantograph current $I_p$; and
  $S_n$: noise factor of n-th harmonic as defined by CCITT (Comite Consultatif International Telegraphique et Telephonique).

Figure 4:
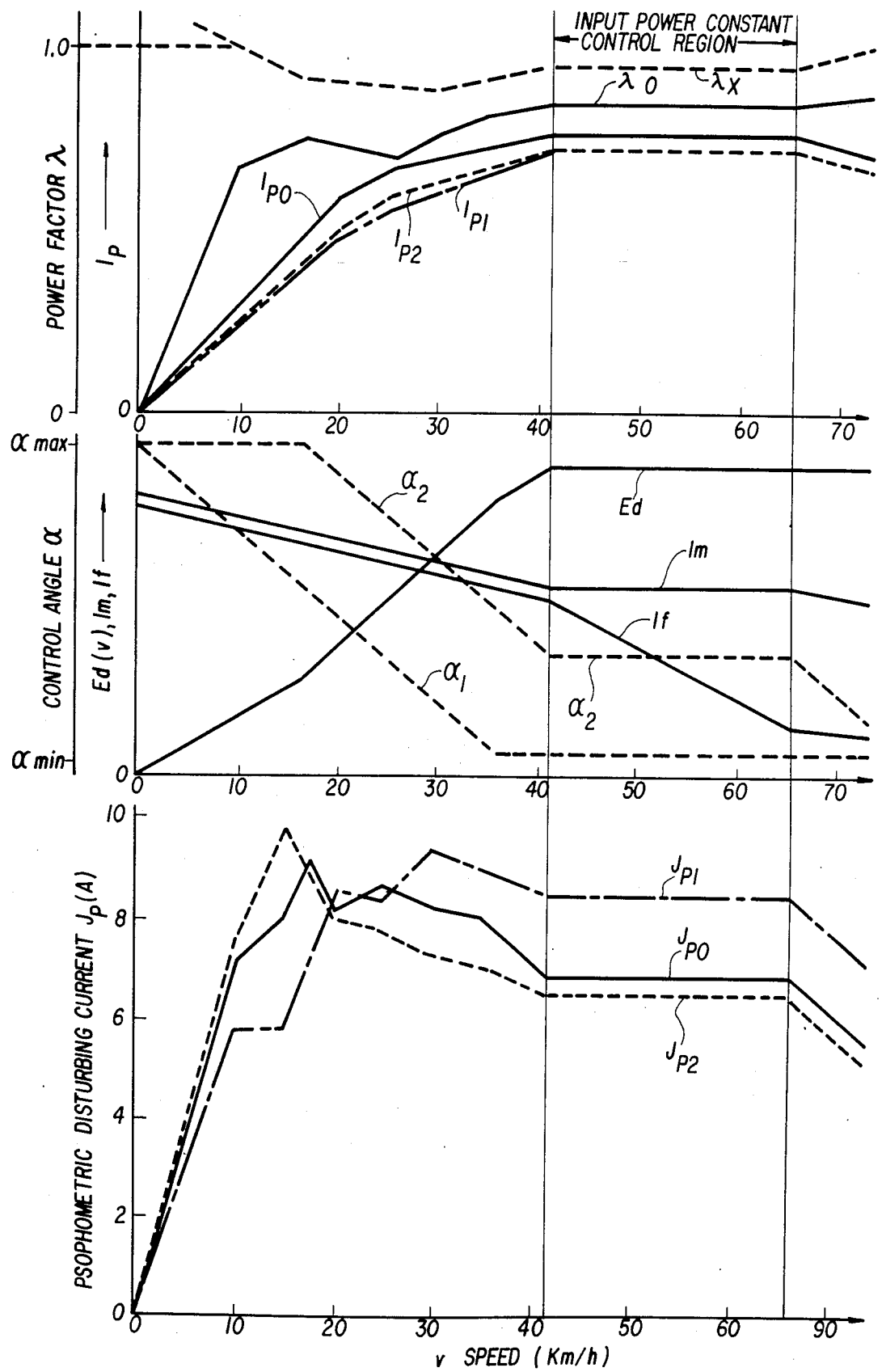
FIGS. 4 and 5 show characteristic curves explanining the performace of one embodiment of the present invention.
Figure 5:
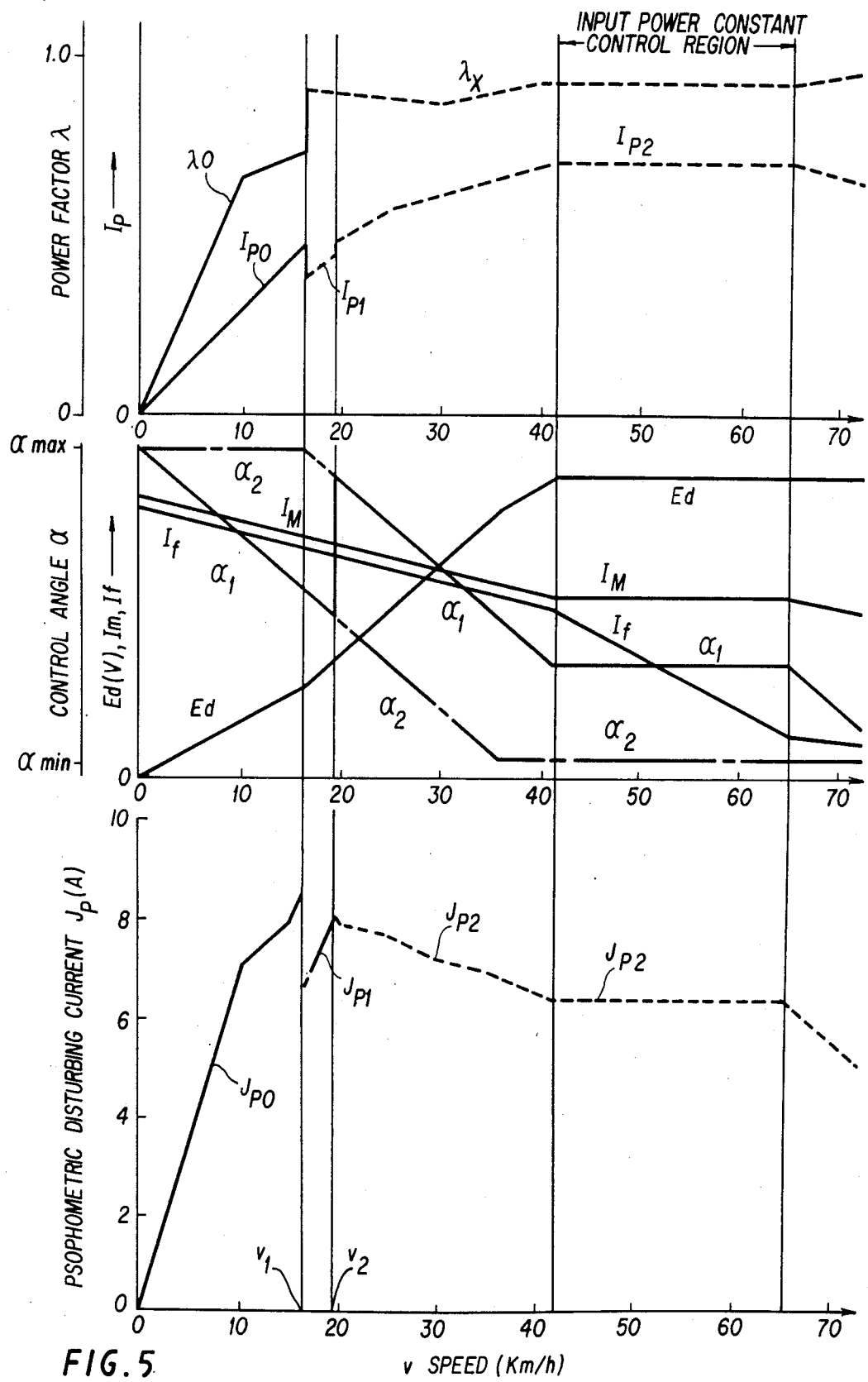

FIGS. 4 and 5 show characteristic curves explaining the advantages of one embodiment of the present invention. The horizontal axis of FIGS. 4 and 5 shows the speed v of the locomotive, while the vertical axes show the psophometric disturbing current $J_p$, the phase control angle $\alpha$, the DC voltage $E_d$, the DC main motor current $I_m$, the field current $I_f$ of the DC main motor M, and the pantograph current $I_p$ and power factor $\lambda$, respectively. FIG. 4 shows various data which are measured under conditions in which the locomotive is running near the substation supplying electric power to the locomotive. $J_{p0}$, $J_{p1}$ and $J_{p2}$ show the psophometric disturbing currents in instances with the power factor controller PFC being not used, the PFC being connected to bridge $B_{r1}$ and the PFC being connected to bridge $B_{r2}$, respectively, when bridge $B_{r1}$ is first controlled as shown in FIG. 3. $\alpha_1$ and $\alpha_2$ show the phase control angles of bridges $B_{r1}$ and $B_{r2}$. $I_{p0}$, $I_{p1}$ and $I_{p2}$ show the pantograph currents in case of the PFC being not used, the PFC being connected to bridge $B_{r1}$ and the PFC being connected to bridge $B_{r2}$, respectively. $\lambda_o$ and $\lambda_x$ show the power factor of the locomotive in case of the PFC being not used and the PFC being used, respectively.

As may be understood from FIG. 4, the psophometric disturbing current $J_p$ is greater in the low speed region (for example $v < 20$ km/h) than in the high speed region, and between the low and high speed regions, $J_{p1}$ and $J_{p2}$ have a reversed relation with $J_{p0}$.

When bridge $B_{r1}$ is first controlled by the PFC, $J_p$ becomes greater in the high speed region, as is shown by $J_{p1}$. Contrarily, where the PFC is connected to bridge $B_{r2}$, $J_p$ becomes greater in the low speed region, because the high harmonic frequency currents which are generated by bridge $B_{r2}$ are not fully reduced by the power factor controlled PFC which is connected to bridge $B_{r1}$.

FIG. 5 shows various data derived from the preferred embodiment under same conditions as the data shown in FIG. 4 was derived. In FIG. 5, $v_1$ denotes the speed at which the PFC on-off control circuit PCC provides firing signals $Th_{5G}$ and $Th_{6G}$ to connect the PFC to bridge $B_{r1}$. $v_2$ denotes the speed at which the comparator CP provides changing signal G to change the phase control signals $T_1$, $T_2$ and $T_3$, $T_4$ of the $APPS_1$ and $APPS_2$ from bridges $B_{r1}$ and $B_{r2}$ to bridges $B_{r2}$ and $B_{r1}$. Therefore, in the embodiment, between speed zero and $v_1$, $J_{p0}$, $I_{p0}$ and $\lambda_0$, between the speed $v_1$ and $v_2$, $J_{p1}$, $I_{p1}$ and $\lambda_x$, and exceeding speed $v_2$, $J_{p2}$, $I_{p2}$ and $\lambda_x$, are gotten, respectively. The phase control angles $\alpha_1$ and $\alpha_2$ of bridges $B_{r1}$ and $B_{r2}$ are changed at speed $v_2$. As may be understood by comprising FIGS. 4 and 5, the amplitude of psophometric disturbing current $J_p$ is suppressed to the level of $J_{p2}$.

This is performed by switching the phase control angles from $\alpha_1$ to $\alpha_2$ whereby the phase control angle of $B_{r1}$ is changed from $\alpha_1$ to $\alpha_2$ while the phase contol angle of $B_{r2}$ is changed from $\alpha_2$ to $\alpha_1$.

Figure 6:
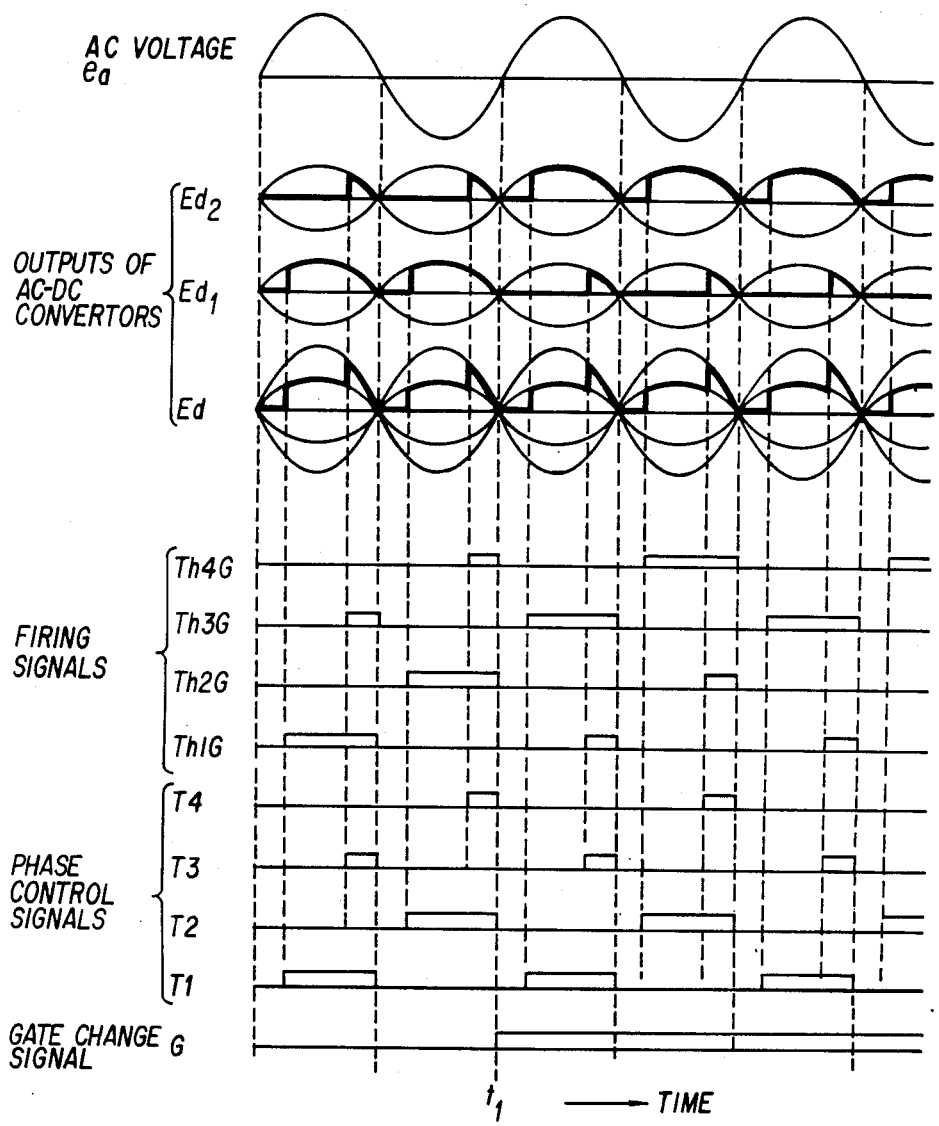
FIG. 6 shows a time chart illustrating wave forms of some important portions of one embodiment.

FIG. 6 shows a time chart illustrating the AC voltage $e_a$, the DC voltages $E_{d1}$, $E_{d2}$ and $E_d$, the thyristor firing signals $Th_{1G}$, $Th_{2G}$, $Th_{3G}$ and $Th_{4G}$, the phase control signals $T_1$, $T_2$, $T_3$ and $T_4$ and the gate change signal G, plotted as a function of time.

As shown in FIG. 6, at time $t_1$, gate change signal G is generated and then the phase control angles of bridges $B_{r1}$ and $B_{r2}$ are changed from $\alpha_1$ to $\alpha_{11}$, and $\alpha_2$ to $\alpha_1$. Therefore, although the effective DC voltage $E_d$ does not vary, the DC voltages $E_{d1}$ and $E_{d2}$ of bridges $B_{r1}$ and $B_2$ are switched each other.

Figure 7:
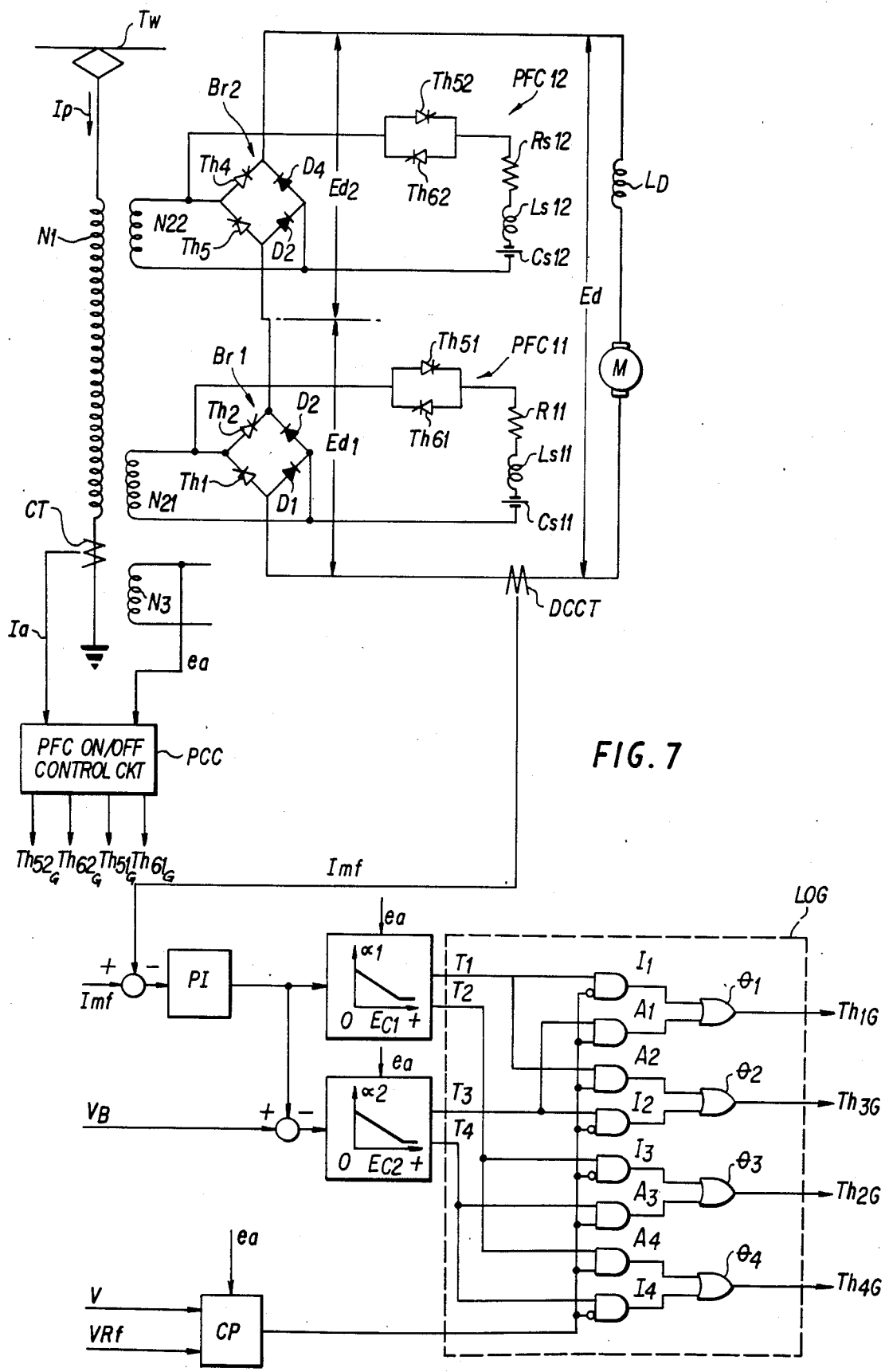
FIG. 7 shows a diagram of an another embodiment of the present invention.

FIG. 7 shows a schematic diagram of another embodiment of the present invention. The embodiment is similar to the embodiment shown in FIG. 1 except for power factor controller PFC and the PFC on-off control circuit PCC. The power factor controller PFC is divided into two power factor controllers $PFC_{11}$ and $PFC_{12}$; the total capacitance of both controllers is the same as that of the PFC of FIG. 1. The capacitance of one of the two power factor controllers (e.g., $PRC_{11}$), however, is larger than that of the other. The PFC on-off control circuit PCC provides firing signals $Th_{51G}$ and $Th_{61G}$ by which the power factor controller (i.e., $PFC_{11}$) having a greater capacitance associated with bridge $B_{r1}$ is connected across bridge $B_{r1}$ when the power factor of the locomotive exceeds a first predetermined value, and provides firing signals $Th_{52G}$ and $Th_{62G}$ by which the power factor controller (i.e., $PFC_{12}$) having a smaller capacitance associated with bridge $B_{r2}$ is connected across bridge $B_{r2}$ when the power factor of the locomotive exceeds a second predetermined value which is greater than the first predetermined value.

Figure 8:
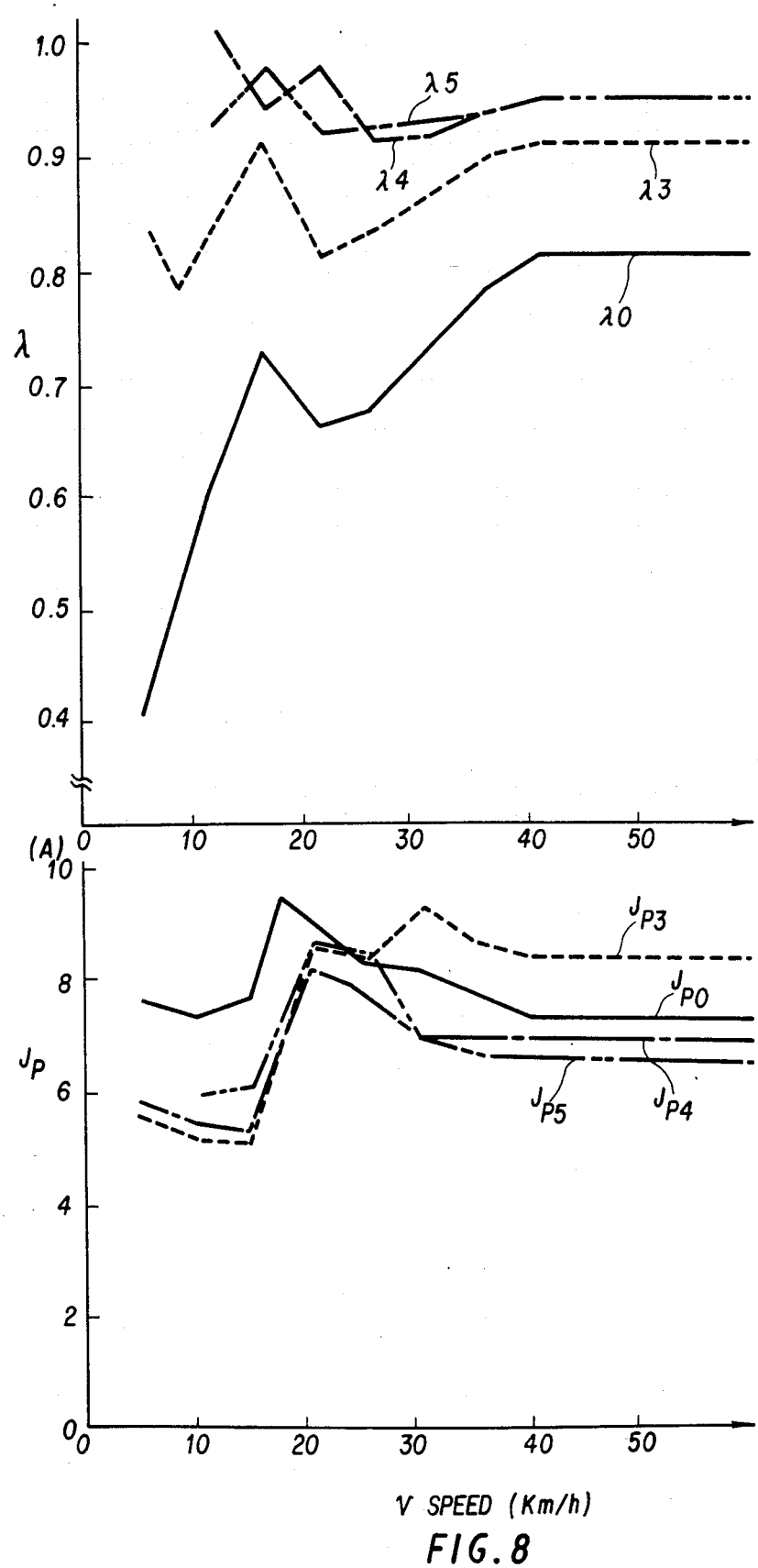
FIGS. 8 and 9 show some characteristic curves corresponding to FIGS. 4 and 5, but for the embodiment shown in FIG. 7.
Figure 9:
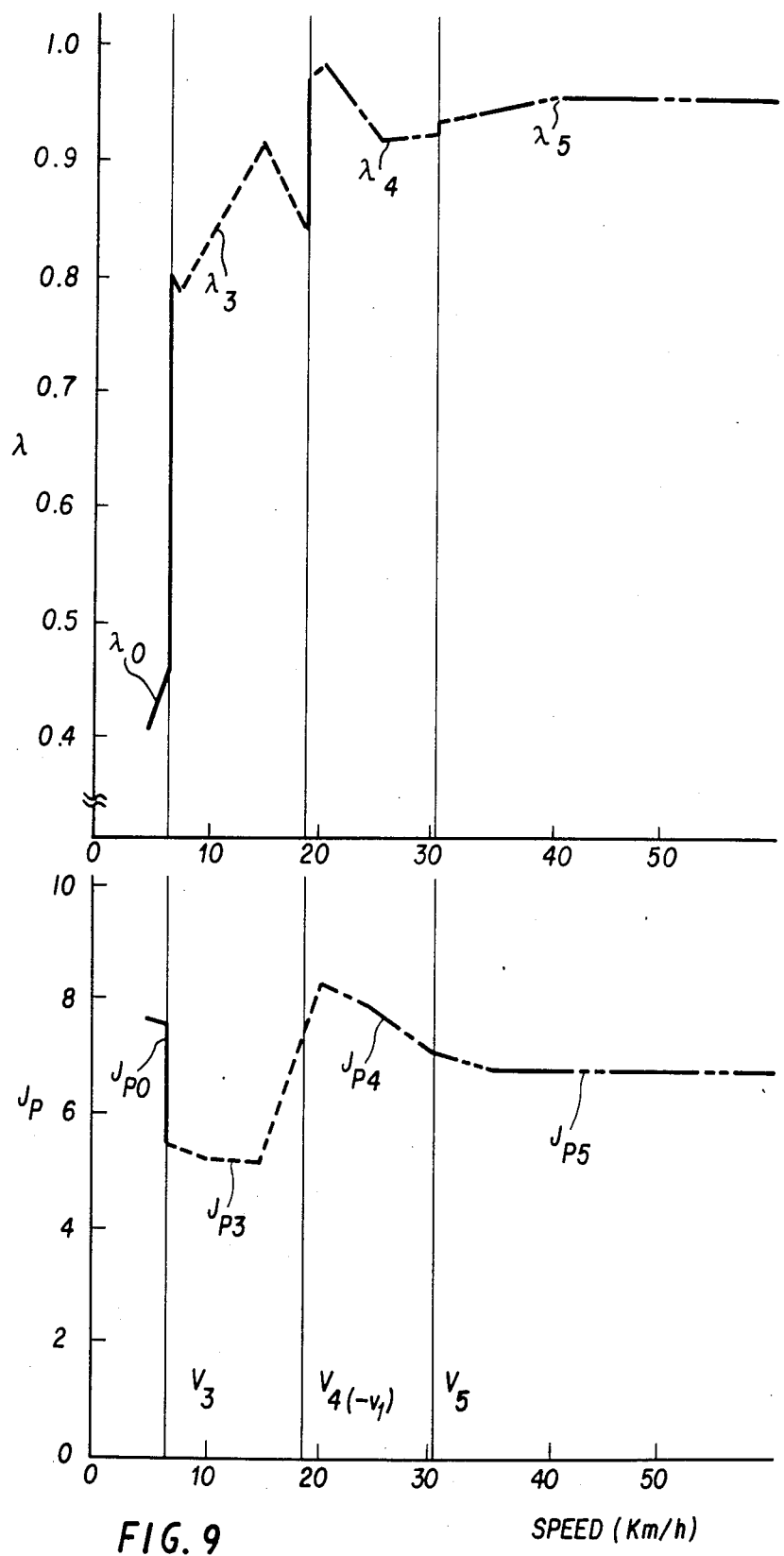

FIG. 8 and FIG. 9 show characteristic curves corresponding to FIGS. 4 and 5 for the embodiment shown in FIG. 7. Only the psophometric distrubing current $J_p$ and the power factor $\lambda$ are shown in order to simplify the drawings as compared with FIGS. 4 and 5. FIG. 8 shows various data which are measured under conditions with the locomotive running at a place about 10 km from the substation. $J_{p0}$, $J_{p3}$, $J_{p4}$ and $J_{p5}$ show the psophometric disturbing currents with both power factor controllers $PFC_{11}$ and $PFC_{12}$ not being used; $PFC_{11}$ being connected to bridge $B_{r1}$; both $PFC_{11}$ and $PFC_{12}$ being connected to bridges $B_{r1}$ and $B_{r2}$, respectively; and both $PFC_{11}$ and $PFC_{12}$ being connected to bridges $B_{r2}$ and $B_{r1}$, respectively, with bridge $B_{r1}$ being first controlled as shown in FIG. 3. $\lambda_0$, $\lambda_3$, $\lambda_4$ and $\lambda_5$ show the power factors of the locomotive with both $PFC_{11}$ and $PFC_{12}$ not being used; $PFC_{11}$ being connected to bridges $B_{r1}$; both $PFC_{11}$ and $PFC_{12}$ being connected to bridges $B_{r1}$ and $B_{r2}$, respectively; and both $PFC_{11}$ and $PFC_{12}$ being connected to bridges $B_{r2}$ and $B_{r1}$, respectively.

FIG. 9 shows data for the embodiment shown in FIG. 7 derived under the same conditions as the data shown in FIG. 8. In FIG. 9, $v_3$ denotes the speed at which the PFC on-off control circuit PCC provides firing signals $Th_{51G}$ and $Th_{61G}$ to connect $PFC_{11}$ to bridge $B_{r1}$. $v_4$ denotes the speed at which the PCC further provides firing signals $Th_{52G}$ and $Th_{62G}$ to connect $PFC_{12}$ to bridge $B_{r2}$. The speed $v_4$ is equal to the speed $v_1$. $v_5$ denotes the speed at which the comparator CP provides gate change signal G to change the phase control signals $T_1$, $T_2$ and $T_3$, $T_4$ of $APPS_1$ and $APPS_2$ from the bridges $B_{r1}$ and $B_{r2}$ to bridges $B_{r2}$ and $B_{r1}$, respectively. Therefore, in this embodiment, between speed zero and $v_3$, $J_{p0}$ and $\lambda_0$ occur; between speed $v_3$ and $v_4$, $J_{p3}$ and $\lambda_3$ occur; between speed $v_4$ and $v_5$, $J_{p4}$ and $\lambda_4$ occur; and above speed $v_5$, $J_{p5}$ and $\lambda_5$ occur. The phase control angles $\alpha_1$ and $\alpha_2$ of bridges $B_{r1}$ and $B_{r2}$ are changed at speed $v_4$. As may be understood by comparing FIGS. 8 and 9, the amplitude of psophometric distrubing current $J_p$ is suppressed by the amplitude of $J_{p5}$. This is performed by changing of the phase control angle between $\alpha_1$ and $\alpha_2$. In the embodiment, additional merit is obtained as follows. The power factor controller $PFC_{11}$ which has a smaller capacitance than that of the PFC shown in FIG. 1 is connected to bridge $B_{r1}$ at speed $v_3$, which is a lower speed than speed $v_1$. Then between speed $v_3$ and $v_1(=v_4)$, the power factor $\lambda$ is improved in comparison with the embodiment shown in FIG. 1 because the two power factor controllers allows the $PFC_{12}$ to be connected to bridge $B_2$ at a lower speed than is possible in embodiments where the total capacitance is to be connected to a single bridge.

Figure 10:
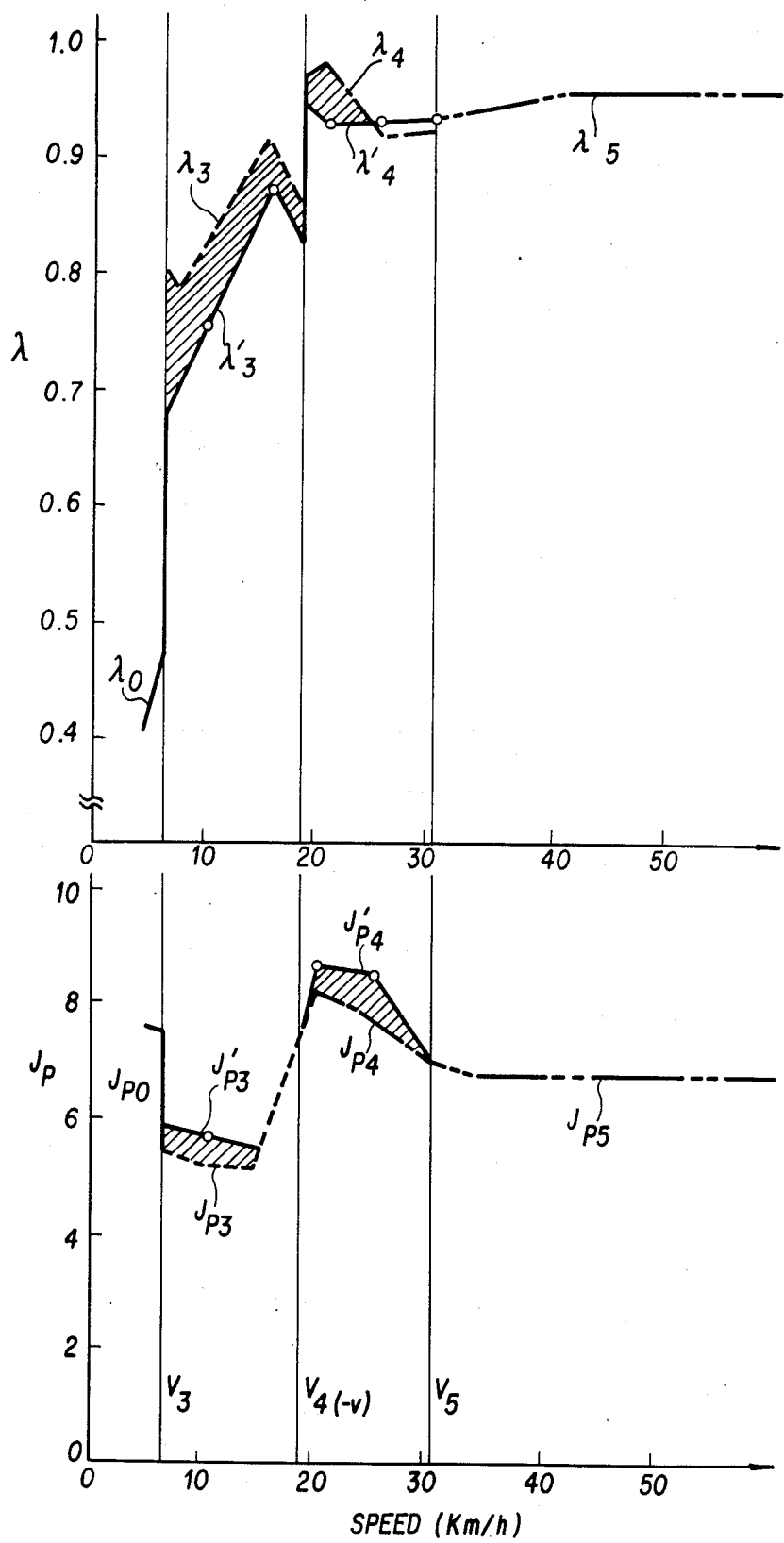
FIG. 10 shows some characteristic curves corresponding to FIG. 9.

In the embodiment of FIG. 7, a minor variation may be made. Namely, the capacitance of the power factor controller $PFC_{11}$ may be made smaller than that of the $PFC_{12}$. Of course, the total capacitance does not change. In this case, the psophometric disturbing current $J_p$ and the power factor $\lambda$ are changed from $J_{p3}$ and $J_{p4}$ and $\lambda_3$ and $\lambda_4$ to $J'_{p3}$ and $J'_{p4}$ and $\lambda'_3$ and $\lambda'_4$, as is shown in FIG. 10. As shown in FIG. 10 by cross hatched lines, both characteristic curves become less desirable by this minor variation.

Figure 11:
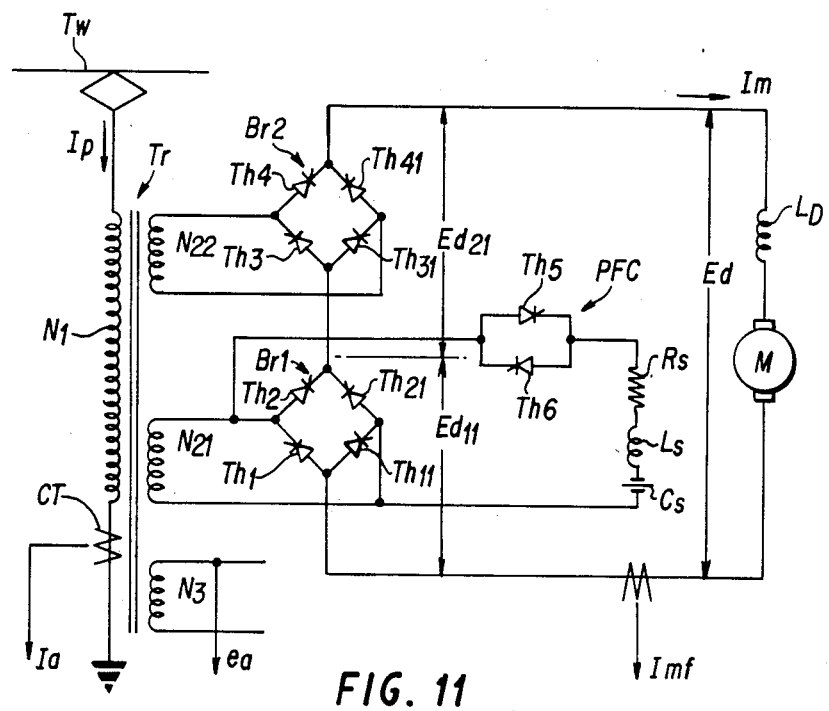
FIGS. 11 and 12 show a diagram of a main circuit portion and a control circuit portion of an another embodiment of the present invention.
Figure 12:
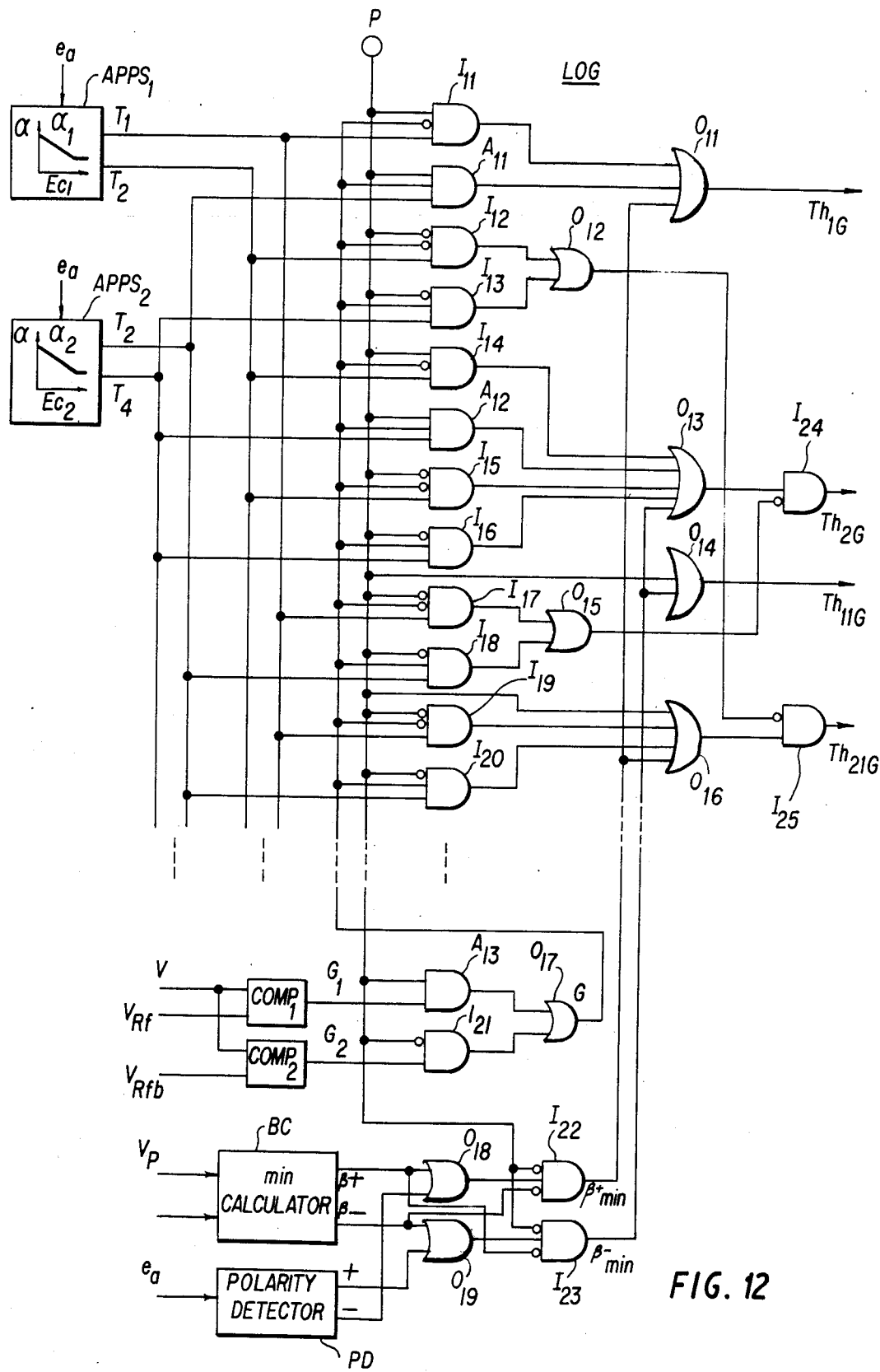

FIG. 11 and FIG. 12 show a diagram of a main circuit portion and a control circuit portion for the main circuit of another embodiment. The circuit shown in FIG. 11 is similar to the circuit shown in FIG. 1 except that diodes $D_1$, $D_2$, $D_3$ and $D_4$ have been replaced by thyristors $Th_{11}$, $Th_{21}$ $Th_{31}$ and $Th_{41}$. Therefore, with this embodiment, a locomotive can operate in a regeneration operation mode while the locomotive is breaking to a stop. FIG. 12 shows a main portion of the control circuit for the main circuit shown in FIG. 11. Some gate circuits for the thyristors of bridge $B_{r2}$ and the input circuits for the automatic pulse phase shifters $APPS_1$ and $APPS_2$ shown in FIG. 1 are omitted in FIG. 12 to simplify the latter drawing. In FIG. 12, $\beta c$ denotes a minimum advanced control angle ($\beta_{min}$) calculator which provides a minimum advanced control angle signal ($\beta_{min}$) for a steady regeneration operation with an AC voltage $v_p$ applied to the bridge and a predetermined commutation margin angle signal $\gamma$. PD denotes a polarity detector which provides polarity signals of the AC voltage $e_a$. P denotes a terminal to which a signal "1" is given when the locomotive is under powered operation. $COMP_1$ and $COMP_2$ denote comparators which provide a gate change signal $G_1$ when the measured speed signal $v$ exceeds the reference signals $v_{Rf}$, and a gate change signal $G_2$ when the measured speed signal $v$ becomes lower than the reference signal $v_{Rfb}$, respectively. One of the signals $G_1$ and $G_2$ is selectively used as gate change signal G when the locomotive is under either powered operation or regeneration operation. For some gates, prefix letters A, I and O denote AND gates, Inhibit gates and OR gates, respectively, as FIG. 1. Formation of the firing signals $Th_{1G}$, $Th_{2G}$, $Th_{11G}$ and $Th_{21G}$ is shown in FIG. 15.

Figure 13:
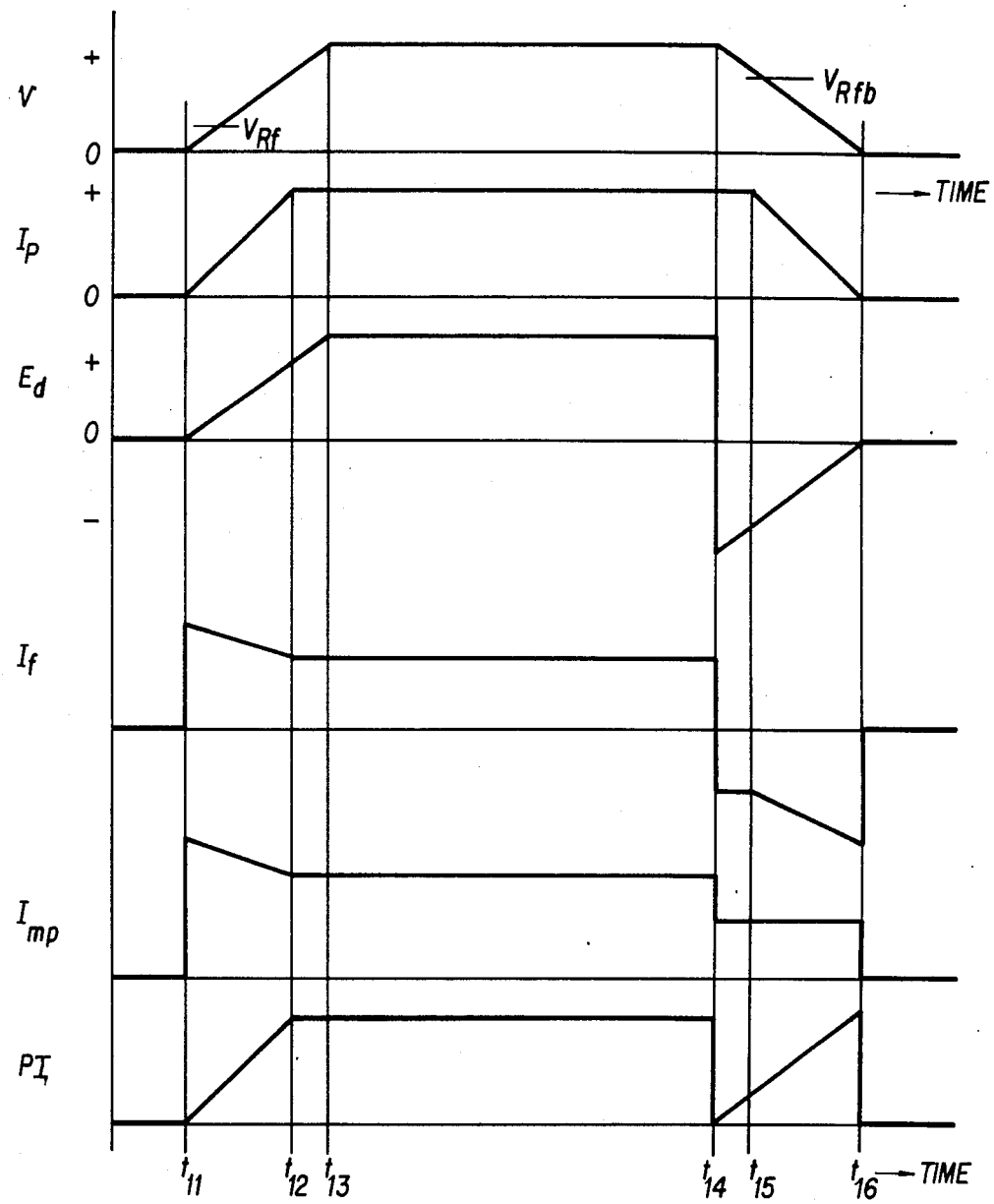
FIG. 13 shows an example of an operational pattern of an electric locomotive.

FIG. 13 shows an example of an operational pattern of locomotive operation. $v$, $I_p$, $E_d$, $I_f$, $I_{mp}$ and PI show a speed pattern, a pantograph current pattern, a DC voltage pattern, a field current pattern of the DC main motor M, a reference current pattern of the DC main motor M and an output pattern of the proportional and integral operational amplifier, respectively. In FIG. 13, the powered operation is a period between $t_{11}$ and $t_{14}$ and the regeneration operation is a period between $t_{14}$ and $t_{16}$. In FIG. 13, $v_{Rf}$ and $v_{Rfb}$ indicate the reference signals applied to the comparators $Comp_1$ and $Comp_2$. The output of the proportional and integral operational amplifier PI is reset to zero when the operational mode of the locomotive is changed from powered operation to regeneration operation at time $t_{14}$. Further, the field current $I_f$ of the main DC motor M is changed to reverse polarity so that the DC voltage $E_d$ of the main DC motor is changed to reverse polarity at time $t_4$.

Figure 14:
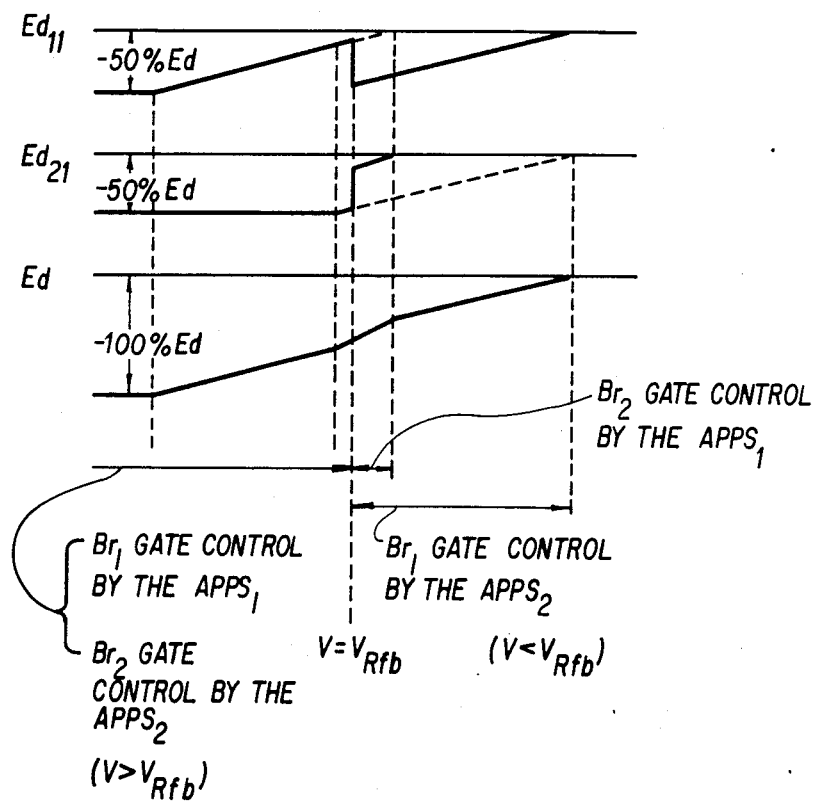
FIG. 14 shows some characteristic curves of AC to DC converter output voltages during an inverter operation.

FIG. 14 shows some characteristic curves of bridge output voltages when the bridges $B_{r1}$ and $B_{r2}$ are operated under regeneration operation. When the locomotive speed $v$ falls below the reference speed $v_{Rfb}$, the phase control signals to the bridges $B_{r1}$ and $B_{r2}$ are switched from $APPS_1$ and $APPS_2$ to $APPS_2$ and $APPS_1$, respectively.

Figure 15:
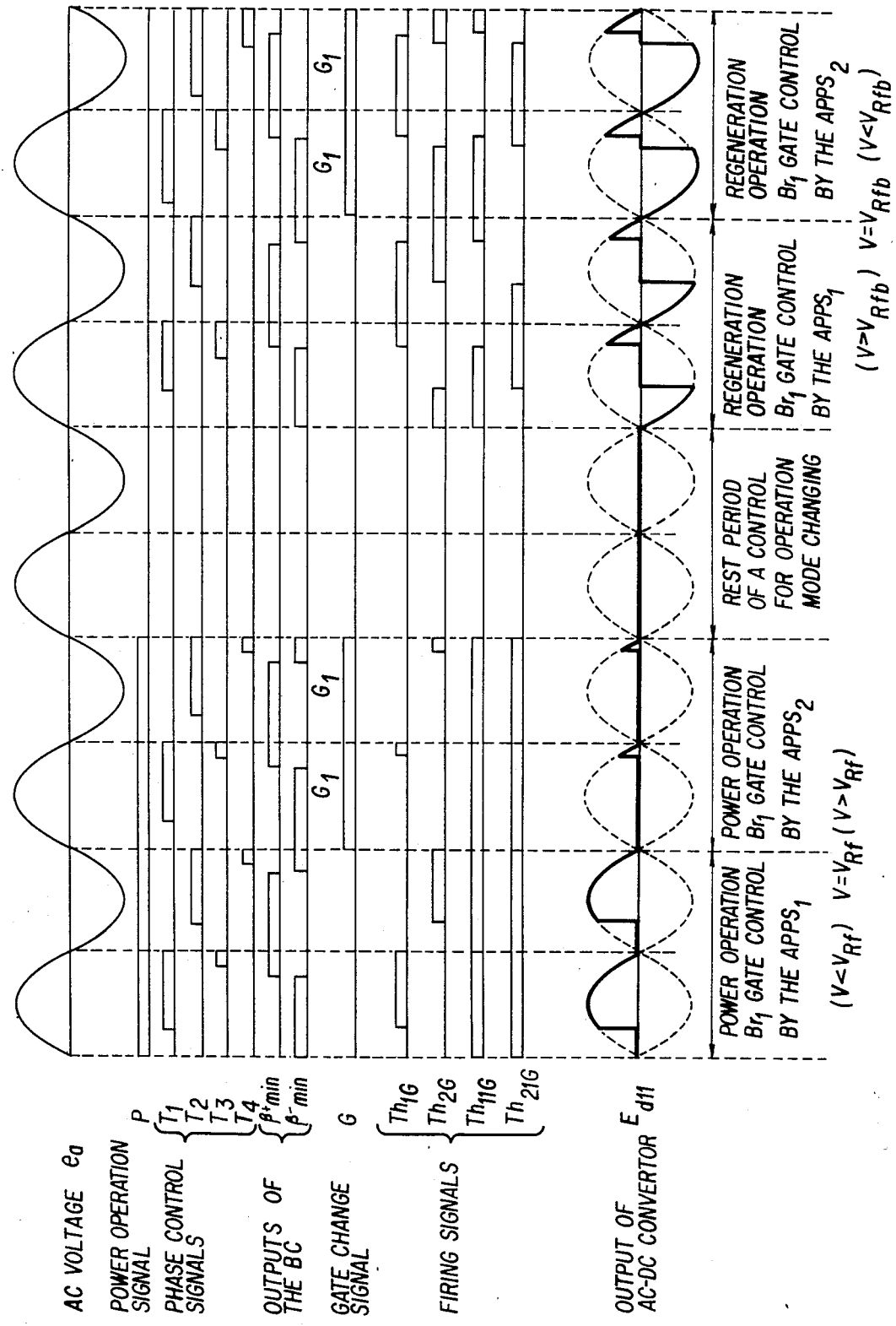
FIG. 15 shows a time chart illustrating waveforms of some important portions of the embodiment shown in FIGS. 11 and 12.

FIG. 15 shows a time chart in which waveforms of some important portions of the operation of the embodiment shown in FIGS. 11 and 12 are shown. In the FIG. 15, the waveforms are divided to illustrate both the powered operation mode and the regeneration mode, respectively, with the waveforms in each mode during two cycle portions being centered upon the time at which the changing signals $G_1$ and $G_2$ are given. There is a rest period shown between the control signals during which all firing signals are interrupted, between the powered operation and the regeneration operation (this rest period corresponds to the time $t_{14}$ shown in FIG. 13).

Figure 16:
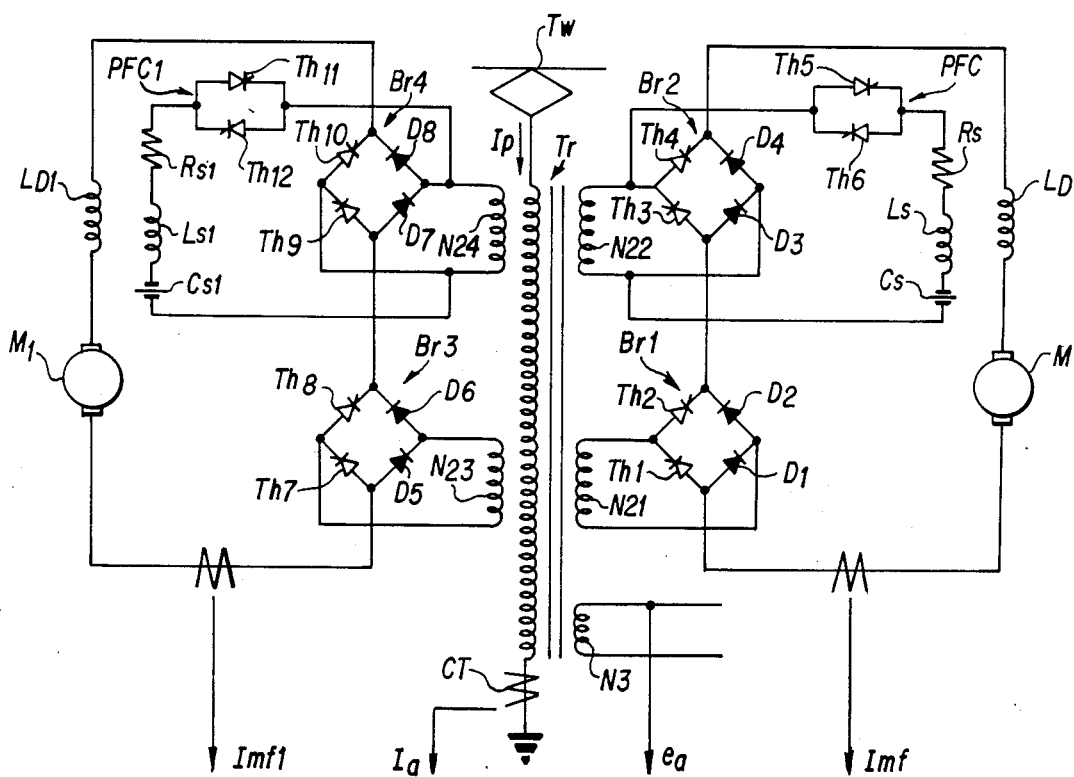
FIGS. 16 and 17 show diagrams of main circuit portions of other embodiments of the present invention.

FIG. 16 shows a diagram of a main circuit portion of another embodiment of the present invention. This is similar to the embodiment shown in FIG. 1 except that another circuit for a second DC main motor $M_1$ is provided, each circuit being separately provided with a factor controller PFC, and $PFC_1$. The control circuit for both power factor controllers of the embodiment are similar to the control portion of the circuit shown in FIG. 1.

Figure 17:
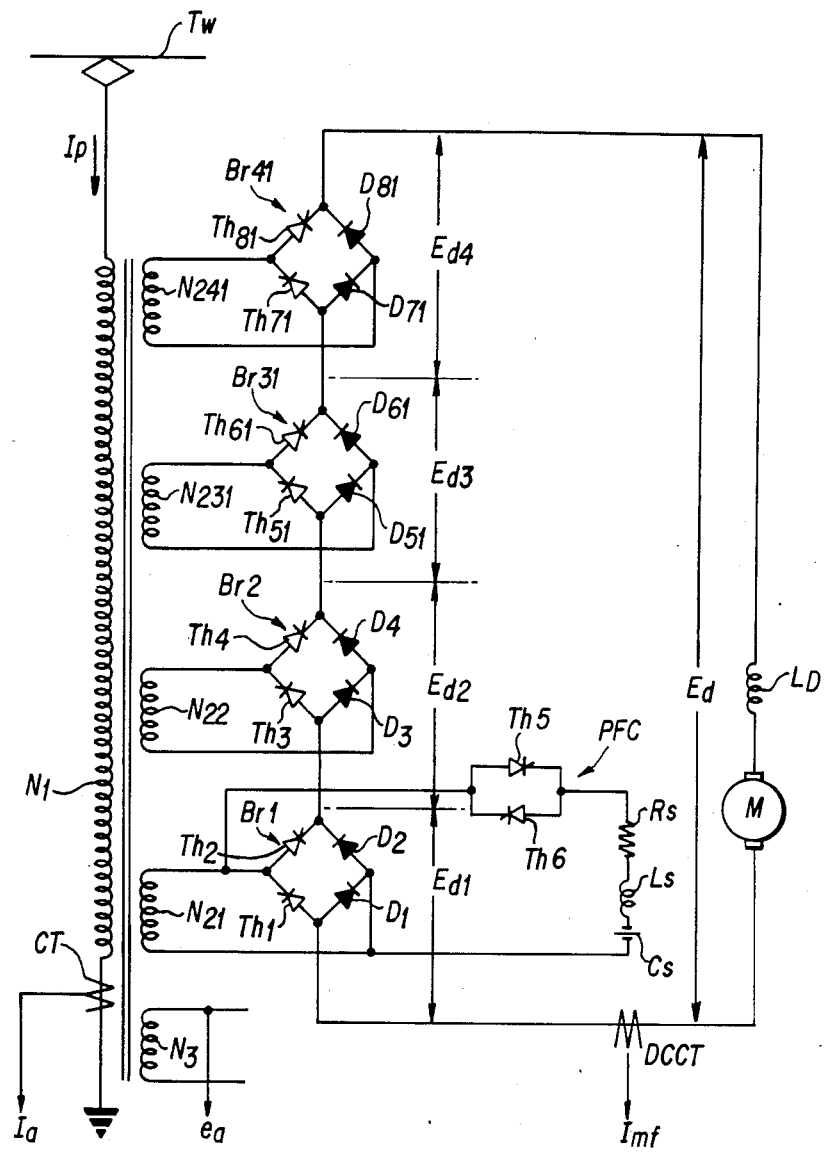
Figure 18:
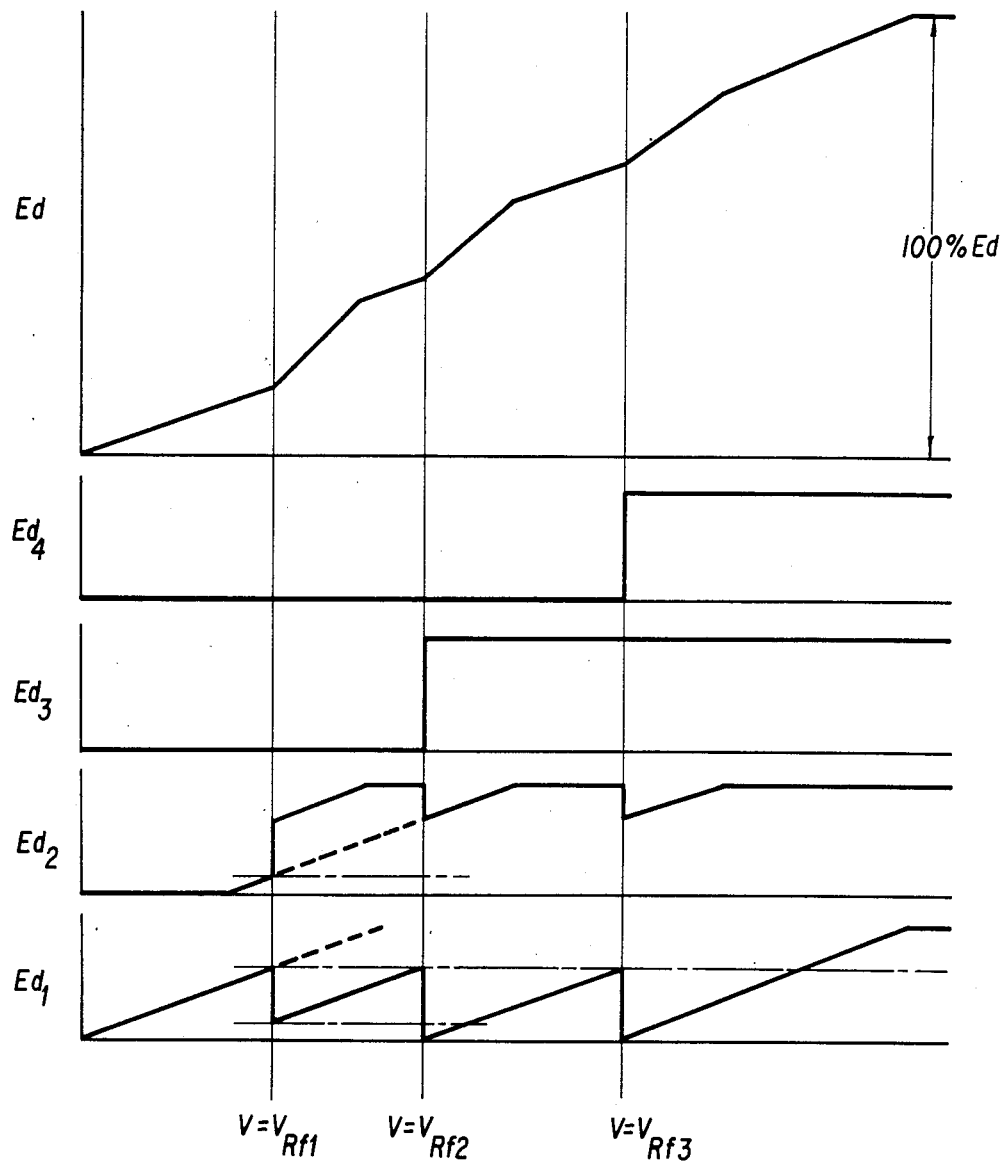
FIG. 18 shows an example of characteristic curves of AC to DC converter output voltages for the circuit of FIG. 17.

FIG. 17 and FIG. 18 show a diagram of a main circuit portion of another embodiment and characteristic curves of output voltages of its AC-DC converter. In FIG. 17, a DC voltage is applied across a DC main motor M by cascade connection of four rectifying bridges $B_{r1}$, $B_{r2}$, $B_{r3}$ and $B_{r4}$. As shown in FIG. 17, the DC voltage applied to the DC main motor is controlled by two bridges $B_{r1}$ and $B_{r2}$. As described in FIG. 3, and shown in FIG. 18, when the locomotive speed $v$ exceeds speed $v_{rf1}$, the phase control signals to bridges $B_{r1}$, $B_{r2}$ are switched form $APPS_1$, $APPS_2$ to $APPS_2$, $APPS_1$. As is further shown in FIG. 18, when the locomotive speed $v$ exceeds speed $v_{rf2}$, the outputs of bridges $B_{r2}$, $B_{r1}$ are shifted to bridges $B_{r3}$, $B_{r2}$ and when the locomotive speed $v$ exceeds speed $v_{rf3}$, the outputs of $B_{r2}$, $B_{r1}$ are shifted to $B_{r4}$, $B_{r2}$. Namely, majority of the DC output voltage is always controlled by bridge $B_{r1}$ to which power factor controller PFC is connected. Therefore, the psophometric disturbing current $J_p$ is effectively reduced in comparison to currently available controllers.

In the above explanation, although the gate change signal G, by which the phase control signals to the bridges are changed between two automatic pulse phase shifters APPS, is obtained from a comparison of a measured speed $v$ of the locomotive with a speed reference signal $v_{Rf}$, various kinds of other signals which represent the amplitude of the psophometric disturbing current $J_p$, may be obtained as follows.

A comparison of:

(i) the amplitude of a measured load of the locomotive with a reference value, or (ii) the amplitude of a DC current flowing through a converter with a reference value, or (iii) the amplitude of an AC current supplied to a converter with a reference value, or (iv) the amplitude of the psophometric disturbing current flowing through a converter with a reference value.

What is claimed is:

1. A control system for an electric locomotive, having two cascaded power converters, one of said converters having a capacitance connectable thereto, comprising:

two firing signal generators responding to an electric current supplied to said converters by generating firing signals, each of the firing signals being supplied to cause operation of different ones of said converters in a predetermined order, with phase control angles of said two firing signal generators being different; and means responsive to a signal related to a speed of the locomotive, for changing the firing signals to be supplied to said two converters when a first condition that the speed-related signal exceeds a predetermined value is satisfied whereby the phase control angle of the firing signal supplied to the one of said converters to which the capacitance is connectable is made greater than that supplied to the other one of said converters.

2. A control system according to claim 1, wherein the speed related signal is a signal indicative of the speed of said locomotive.

3. A control system according to claim 1, wherein said speed-related signal is proportional to a magnitude of a direct current flowing through said converters.

4. A control system according to claim 1, wherein said speed-related signal is proportional to the magnitude of an alternating current supplied to said converters.

5. A control system for an electric locomotive, having two cascaded power converters, one of said converters having a capacitance connectable thereto, comprising:

two firing signal generators responding to an electric current supplied to said converters by generating firing signals, each of the firing signals being supplied to cause operation of different ones of said converters in a predetermined order, with phase control angles of said two firing signal generators being different; and means responsive to a magnitude of a psophometric disturbing current component included in the current supplied to said converters, and changing the firing signals to be supplied to said two converters when a first condition that the magnitude of the psophometric disturbing current exceeds a predetermined value is satisfied, whereby the phase control angle of the firing signal supplied to the one of said converters to which the capacitance is connectable is made greater than that supplied to the other converter.

6. A system for an electric locomotive having two cascaded power converters, a first capacitance connected to one of said converters and a second capacitance connected to the other one of said converters, the first capacitance being larger than the second capacitance, comprising:

two firing signal generators responding to an electric current supplied to said converters by generating firing signals, each of the firing signals being supplied to cause operation of different ones of said converters in a predetermined order, with phase control angles of said two firing signal generators being different; and means responsive to a signal related to a speed of the locomotive for changing the firing signals to be supplied to said two converters when a first condition that the speed-related signal exceeds a predetermined value is satisfied, whereby the phase control angle of the firing signal supplied to the one of said converters to which the capacitance is connectable is made greater than that supplied to the other converter.

7. A control system according to claim 6 wherein the speed-related signal is a signal indicative of the speed of said locomotive 8. A control system according to claim 6 wherein said speed related signal is a signal proportional to a magnitude of a direct current flowing through said converters 9. A control system according to claim 6, wherein the speed-related signal is a signal proportional to a magnitude of an alternating current supplied to said converters.

10. A control system for an electric locomotive, having two cascaded power converters, a first capacitance connected to one of said converters and a second capacitance connected to the other converter, the first capacitance being larger than the second one, comprising:

two firing signal generators responding to an electric current supplied to said converters by generating firing signals, each of the firing signals being supplied to cause operation of different ones of said converters in a predetermined order, with phase control angles of said two firing signal generators being different; and means responsive to a magnitude of a psophometric disturbing current component included in the current supplied to said converters, and changing the firing signals to be supplied to said two converters when a first condition that the magnitude of the psophometric disturbing current component exceeds a predetermined value is satisfied, whereby the phase control angle of the firing signal supplied to the one of said converters to which the capacitance is connectable is made greater than that supplied to the other converter.

11. A control system for an electric locomotive, having two power converters, which are also operable as inverters, one of said converters having a capacitance connectable thereto, comprising:

two firing signal generators responding to an electric current flowing to the converters by generating firing signals, each of said firing signals being supplied to cause operation of different ones of said converters in a predetermined order, with the phase control angles of said two firing signal generators being different; and means responsive to two signals related to a speed of the locomotive, for changing said two firing signals to be supplied to said two converters when a first condition with one of the speed-related signals exceeding a predetermined valve is satisfied during a powered operation of said converters or when a second condition that the other speed-related signal is lower than a predetermined value is satisfied during a regeneration operation of said converters whereby the phase control angle of said firing signal supplied to one of said converters to which a capacitance is connectable is made greater than the phase control angle of the other one of said firing signals supplied to the said other one of said converters.

12. A control system according to claim 11, further comprising:

generating means for providing minimum advanced control angle signals from an AC voltage applied to said converters and a predetermined commutation margin angle signal for said converters, said minimum advanced control angle signals being combined with the firing signals to regulate a commutation margin angle during the regeneration operation, whereby the commutation failure of said converters is prevented.

13. A control system according to claim 11, wherein the speed-related signals are signals indicative of the speed of the locomotive.

14. A control system according to claim 11 wherein the speed-related signals are proportional to a magnitude of a direct current flowing through said converters.

15. (Amended) A control system according to claim 11, wherein the speed-related signals are proportional to a magnitude of an alternating current flowing through said converters.

16. A control system for an electric locomotive, having two cascaded power converters, which are also operable as inverters, one of the said converters having a capacitance connectable thereto, comprising:

two firing signal generators responding to an electric current flowing through said converters by generating firing signals, each of the firing signals being supplied to cause operation of different ones of said converters in a predetermined order, with phase control angles of said two firing signal generators being different; and means responsive to a magnitude of a psophometric disturbing current component including in the current flowing through said converters, for changing the firing signals to be supplied to said two converters when the magnitude of the psophometric current psophometric current component exceeds a predetermined value, whereby the phase control angle of the firing signal supplied to the one of said converters to which the capacitance is connectable is made greater than that supplied to the other converter.

17. A control system according to claim 1, further comprising:

switching means for connecting the capacitance to the one of said converters when a power factor of the locomotive exceeds a predetermined value.

18. A method for controlling an electric locomotive having two cascaded power converters and a capacitance connected to one of said converters, comprising:

providing firing signals from two firing signal generators, each of the firing signals being supplied to cause operation of different ones of said converters in a predetermined order, with phase control angles of said two firing signal generators being different; and changing the firing signals to be supplied to said two converters when a signal related to a speed of the locomotive exceeds a predetermined value, whereby the phase control angle of the firing signal supplied to the one of said converters to which a capacitance is connectable is made greater than that supplied to the other converter.

19. A control system for an AC electric locomotive, comprising:

a transformer having a plurality of secondary windings;

a plurality of power converters controlled by firing signals and adapted to receive the AC voltages of said secondary windings as AC inputs and having DC sides connected in cascade with one another;

a main electric locomotive motor adapted to be powered by said converters;

means for controlling phase control angles of the firing signals of said converters sequentially;

power factor control means connected across AC input terminals of at least one of said converters and having a capacitance, an inductance and a resistance; and means for switching the phase control angles between one of said converters and the other converter when a first condition of the locomotive is satisfied, whereby the phase control angle of the firing signal of one of said converters is made greater than that of the other converter.

20. A control system for an AC electric locomotive, according to claim 19, wherein said switching means is adapted to respond to a signal corresponding to the velocity of the electric locomotive after said corresponding signal has reached a predetermined value.

21. A control system for an AC electric locomotive, according to claim 19, wherein said switching means is adapted to respond to an AC input current reaching a predetermined value.

22. A control system for an AC electric locomotive according to claim 22, wherein said switching means is adapted to respond to harmonic currents contained in an AC input current after the magnitude of the harmonic currents have reached a predetermined value.

23. A control system for an AC electric locomotive according to claim 22, wherein said switching means is adapted to respond to a psophometric disturbing current contained in an AC input current after the magnitude of the psophometric disturbing current has reached a predetermined value.

24. A control system for an AC electric locomotive according to claim 17, wherein said converters are also operable as inverters and said switching means is adapted to respond to two predetermined values, in which one of the predetermined values provided for a power operation, during which said converters operate as AC to DC converters, is different from the other predetermined value provided for a regeneration operation, during which said converters operate as AC to DC inverters.

25. A control system for an AC electric locomotive, comprising:

a transformer having a plurality of secondary windings;

a plurality of power converters controlled by firing signals and adapted to receive the AC voltages of said secondary windings as AC inputs and having DC sides connected in cascade with one another;

a main electric locomotive motor adapted to be powered by said converters;

means for controlling phase control angles of firing signals of said converters sequentially, wherein during a first mode two of said converters have firing signals controlled together but with a difference in phase control angles;

power factor control means connected across AC input terminals of at least one of said converters and having a capacitance, an inductance and a resistance; and means for switching the phase control angles between one of said converters to which said power factor control means is connected and the other converter when a first condition of the locomotive is satisfied, whereby the phase control angle of the firing signal of one of said converters is made greater than that of the other converter.

26. A control system for an AC electric locomotive according to claim 28, wherein said power factor control means is removably connectable across the AC input terminals and is adapted to be connected to the AC input terminals in response to a predetermined status of the AC electric locomotive.

27. A control system for an AC electric locomotive, according to claim 25, wherein said switching means includes semiconductor logic means for switching the phase control signals.

28. A control system for an AC electric locomotive, comprising:
 a transformer having a plurality of secondary windings;
 a plurality of power converters controlled by firing signals and adapted to receive the AC voltages of said secondary windings as AC inputs and having DC sides connected in cascade with one another;
 a main electric locomotive motor adapted to be powered by said converters;
 means for controlling phase control angles of firing signals of said converters sequentially;
 power factor control means of different capacities connected across AC input terminals of at least one of said converters and each including a capacitance, an inductance and a resistance, one of the capacitances being a relatively larger capacitance; and
 means for switching the phase control angles of two of said converters whereby the output voltage of one of said two converters to which one of said power factor control means having the relatively larger capacitance is connected, may take a relatively smaller value.

29. A control system according to claim 12, wherein said generating means for providing minimum advanced control angle signals provides a predetermined constant advanced control signal according to a characteristic of said converters.

* * * * *